United States Patent [19]
Yound et al.

[11] 3,812,777
[45] May 28, 1974

[54] MOUNTING STRUCTURES FOR THE FEED MECHANISM OF A CROP BALER

[75] Inventors: Robert G. Yound, Bird-in-Hand; Paul S. Trible, Ephrata; Emmett F. Glass, Akron, all of Pa.

[73] Assignee: Sperry Rand Corporation, New Holland, Pa.

[22] Filed: Sept. 1, 1972

[21] Appl. No.: 285,947

[52] U.S. Cl. .................................. 100/189, 56/341
[51] Int. Cl. ............................................ B30b 15/30
[58] Field of Search .......... 100/189, 188 R, 188 BT, 100/215, 216, 217, 142; 214/5, 144, 147; 56/361, 131, 153, 341, 342, 343; 198/223, 221, 218; 130/1, 2; 68/158

[56] References Cited
UNITED STATES PATENTS
| | | | |
|---|---|---|---|
| 3,636,896 | 1/1972 | D'Acremont et al. | 100/189 |
| 3,724,363 | 4/1973 | Nolt | 100/189 |

FOREIGN PATENTS OR APPLICATIONS
| | | | |
|---|---|---|---|
| 993,841 | 6/1965 | Great Britain | 100/189 |

*Primary Examiner*—Leon G. Machlin
*Attorney, Agent, or Firm*—Frank A. Seemar; John R. Flanagan; Joseph A. Brown

[57] ABSTRACT

An improved mounting structure for the feed mechanism of a crop baler. The feeding mechanism includes a feed finger support mechanism and a channel assembly, the feed finger support mechanism being slideably interconnected with the channel assembly being supported by a second drive means. Means are provided whereby the feed finger support mechanism may be easily disconnected from its associated drive means, and similarly, means are provided whereby the channel assembly can be easily removed from its associated drive means whereby the feed mechanism for the crop baler can be easily removed from the crop baler for service and the like.

7 Claims, 6 Drawing Figures

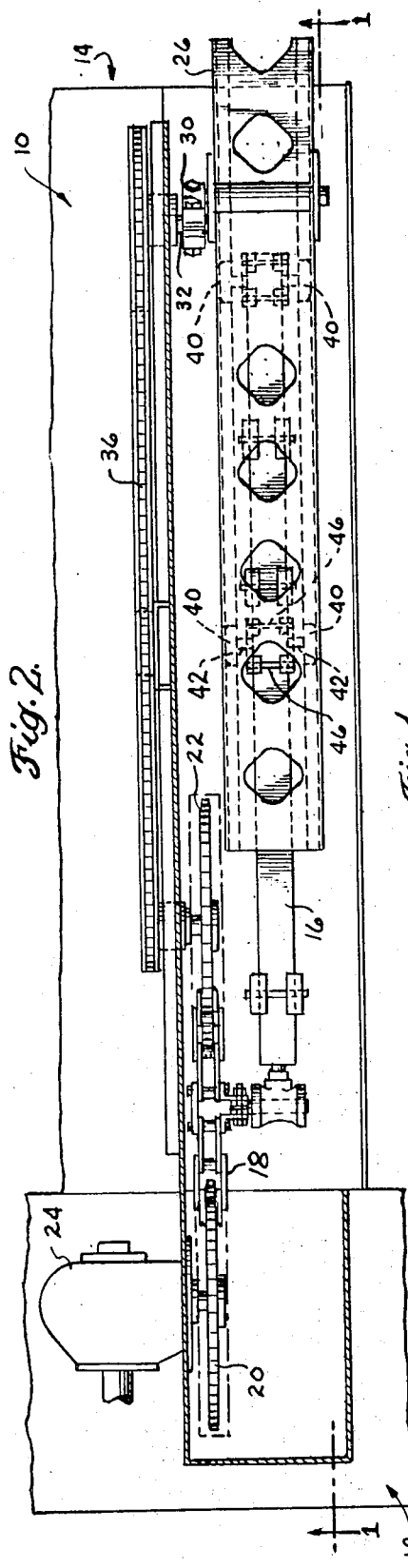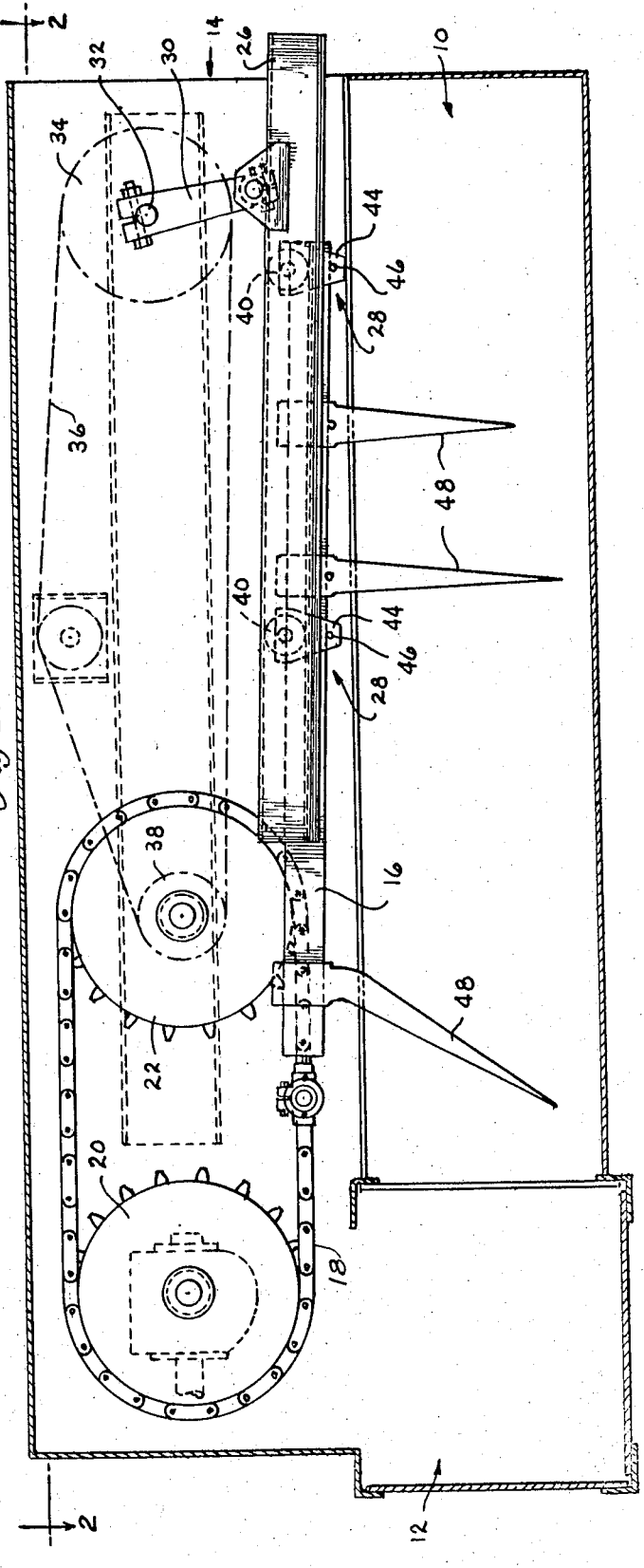

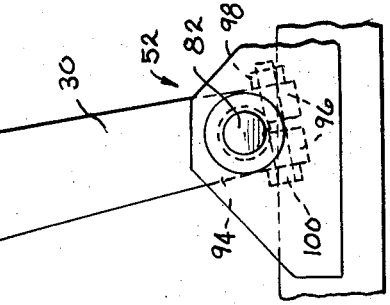
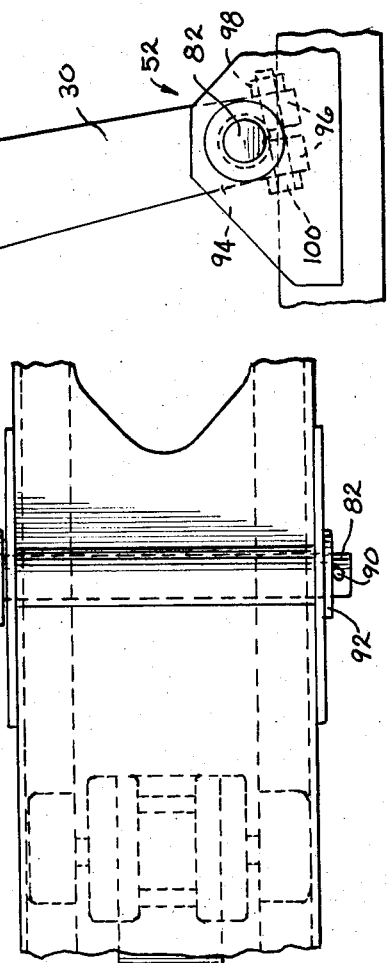
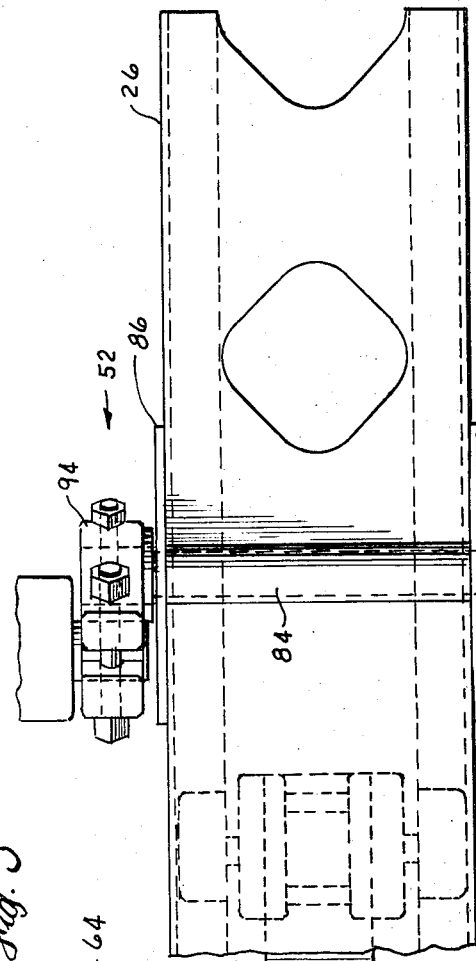
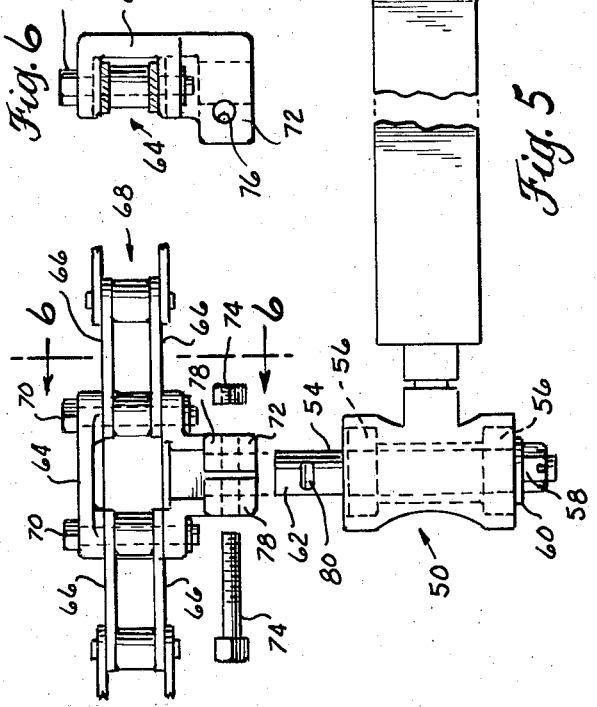
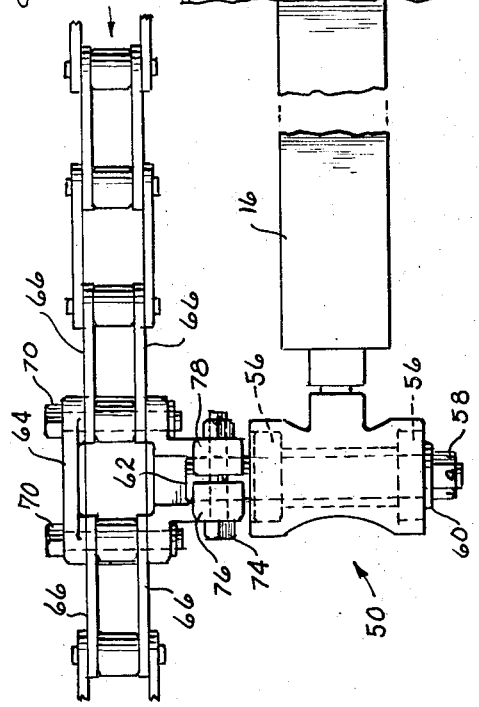

MOUNTING STRUCTURES FOR THE FEED MECHANISM OF A CROP BALER

CROSS REFERENCE TO RELATED APPLICATIONS

This application relates to copending U.S. application Ser. No. 148,374 filed on June 1, 1971 by Edwin B. Nolt and entitled "Feed Mechanism for a Crop Baler," said application being assigned to the same assignee as this application, and now U.S. Pat. No. 3,724,363 issued Apr. 3, 1973.

FIELD OF THE INVENTION

The present invention relates generally to agricultural machinery, and more particularly to crop balers having an improved feed mechanism capable of operating at high speed.

BACKGROUND OF THE INVENTION

In copending U.S. application Ser. No. 148,374 an improved high speed feed mechanism for crop balers is illustrated. In this design a feed finger supporting mechanism is secured at one end to a chain which is driven over a pair of sprockets to give said one end of the feed finger supporting mechanism an oval motion. The other end of the feed fingers supporting mechanism is supported for reciprocal motion in a channel member or assembly by spaced apart roller assemblies. A portion of the channel member is secured to a crank arm which imparts to said portion of the channel member a circular motion. By employing the principle of the foregoing patent application it has been possible to materially increase the feeding speeds of a finger feed baler feed mechanism. In order to service the feeding mechanism shown in said foregoing patent application, it is necessary to provide means whereby the feed finger supporting mechanism and the associated channel assembly can be easily assembled and disassembled to the drive mechanism of the feed mechanism.

In U.S. Pat. No. 3,517,609 an earlier design of a high speed feed finger feeding mechanism for a baler is illustrated. In this design a feed finger supporting mechanism is secured at one end to a chain by a pivot shaft secured to the chain. The other end of the feed finger supporting mechanism is telescopically mounted about a support member which is in turn carried on the outer end of a crank arm by a pivot shaft secured to the crank arm. The feed finger supporting mechanism and the support member each carries roller bearings or the like which are press fitted about the associated shaft member. To insure that the supporting mechanism and the support member are maintained on the shafts, fastening means are provided at the outer end of the shafts. In order to remove the feed finger support mechanism and the support member from the bale case it is necessary to remove the outer fastening means. Then it is necessary to place the feeding mechanism in its uppermost position to avoid interference with other portions of the baler during the removal operation. Then, it is necessary to force the bearings off the shaft by hammering on the members or the like. It has been found in practice that it is extremely difficult to remove the feeding mechanism from the baler with this type of mounting structure.

OBJECTS AND SUMMARY OF THE INVENTION

It is the principle object of this invention to provide means whereby the feed mechanism of a high speed baler feed mechanism can be easily assembled and disassembled to the drive mechanism of the feed mechanism to facilitate servicing and the like.

More specifically, it is an object of the present invention to provide pivot means on each of the channel assembly and feed finger supporting mechanism and means to which the pivot means may be releasably clamped, the releasable clamping means being supported on the first and second drive means.

These and other objects and advantages of this invention will be apparent to those skilled in the art after a consideration of the following detailed description, taken in conjunction with the accompanying drawings in which the preferred form of this invention is illustrated.

BRIEF DESCRIPTION OF THE DRAWINGS

FIG. 1 is a view taken from the rear of the feed mechanism constructed in accordance with the principles of this invention, this view corresponding to a section taken along the line 1—1 of FIG. 2.

FIG. 2 is a plan view of the improved feed mechanism of this invention taken generally along the line 2—2 of FIG. 1.

FIG. 3 is a broken out plan view illustrating the feed fingers supporting bar and the channel assembly detachably connected to the chain of the first drive means by a two part chain connector and to the lower end of the crank arm of the second drive means.

FIG. 4 is a detailed view of the crank arm illustrating its connection to the channel assembly by a detachable bolt.

FIG. 5 is a broken out plan view illustrating the feed finger supporting mechanism and channel assembly detached as a unit from the chain connector and the crank bar.

FIG. 6 is a cross section of the chain connector taken along the line 6—6 of FIG. 5.

In the following description right-hand and left-hand reference is determined by standing to the rear of the crop baler and facing the direction of travel. In addition, the terms inboard and outboard refer to those portions of the feeding mechanism which are adjacent and remote, respectively, to the bale case.

Referring first to FIGS. 1 and 2, an improved high speed mechanism crop balers of the type set forth in greater detail in copending U.S. application Ser. No. 148,374 is shown in these views. The feed mechanism is adapted to sweep crop material from a feed chamber, indicated generally at 10, towards a bale case, indicated generally at 12. The feeding mechanism, which is indicated generally at 14, includes a feed finger support mechanism 16 which is secured at its inboard or left-hand end to a chain 18 which is in turn disposed about inboard and outboard sprockets 20,22, respectively. The inboard sprocket is operatively connected to a gearbox 24 which in turn is operatively interconnected to a generally conventional power source. The chain and sprockets constitute a first drive mechanism which impart to the left-hand end of the feed finger support mechanism 16 a generally elliptical motion. The right-hand or outboard end of the feed finger support mechanism is supported in a support or channel structure 26 by a pair of spaced apart roller assemblies, each of which is indicated generally at 28. The right-hand or outboard end of the channel structure 26 is connected to the outer end of a crank bar 30, the inner end of the crank bar being secured to a rotatable shaft 32. The shaft 32 is in turn operatively connected to a sprocket 34 which is caused to rotate in a generally clockwise direction by a chain 36 which passes over a sprocket 38 mounted concentrically with the sprocket 22. The crank arm constitutes a second drive mechanism and is timed by the chain 36 with the first drive mechanism, the second drive mechanism imparting a generally circular motion to the right-hand end of the channel structure 26.

Each of the spaced apart roller assemblies constitute a pair of opposed front and rear rollers 40 which are rotatably journalled on stub shafts 42 carried by mounting brackets 44 which are secured to each other into the feed finger supporting mechanism 16 by fasteners 46.

From the foregoing it should be obvious as the first and second drive mechanisms rotate that the feed fingers 48 carried by the feed finger support mechanism 16 will be advanced into the bale case and then moved upwardly and rearwardly during a retraction stroke, and then will again advance towards the bale case through a downward and forward movement. As the feed fingers 48 feed crop material into the bale case the spaced apart roller assemblies will roll within the channel structure 26.

FIGS. 3 through 6 show the improved mounting structure of this invention shown in greater detail. The mounting structure includes first and second connecting means, indicated generally at 50,52, respectively, which serve to connect an inboard portion of the feed finger supporting mechanism 16 and an outboard portion of the support structure 26, respectively, to the first and second drive means, respectively. The first connector means includes a shaft 54 rotatably journalled in bearings 56 which are disposed within an aperture in the inboard portion of the feed finger supporting mechanism, the bearings being press fitted about the shaft 54. One end of the shaft is threaded and a nut 58, which bears against a washer 60, is disposed on the threaded end portion. The other end of the shaft is provided with a laterally outwardly extending portion 62. The first connecting means also includes a chain link connector 64 which is secured on opposite side portions to links 66 of a roller chain, indicated generally at 68, by studs 70. Disposed to one side of the chain link connector is a C-shaped clamping member 72 which is adapted to clampingly embrace the laterally outwardly extending portion 62 of the shaft 54. To this end the C-shaped member is provided with fastening means 74 (in the form of a conventional nut and bolt assembly) which is adapted to pass through spaced apart apertures 76 in spaced apart portions 78 of the C-shaped member. In order to move rigidly hold the shaft 54 within the C-shaped clamping member 72 a groove 80 is provided on the laterally outwardly extending portion 62, the groove being engageable by the bolt 74 to both hold the shaft from rotation within the C-shaped clamping member and also to prevent its lateral movement. It should be obvious that by loosening the fastening means 74 and withdrawing it from the apertures 76 that the shaft may be withdrawn to the position indicated generally in FIG. 5.

The second connecting means is generally similar to the first connecting and includes a shaft 82 rotatably journalled within a sleeve 84 carried by spaced apart brackets 86 secured to front and rear portions of the channel structure 26. One end of the shaft 82 carries a laterally outwardly extending bushing or the like 88. The other end of the shaft 82 carries a roll pin 90 which bears against a washer 92. The laterally outwardly extending portion 88 is received in a C-shaped clamping member 94 formed on the radially outer end portion of the crank arm 30. The C-shaped member has spaced apart apertured end portions 96 through which fastening means in the form of a nut 98 and bolt 100 may be disposed. The laterally outwardly extending portion 88 of the shaft is clamped within the C-shaped member 94 merely by tightening the fastening means 98,100.

The advantages of the foregoing structure should be apparent, however it should be noted that to remove the feeding mechanism it is only necessary to remove the bolt 74 and loosen the bolt 100 whereby the laterally outwardly extending end portions 62 and 88 can be slid in a rearward direction out of the C-shaped clamping members at which time the whole feeding mechanism can be easily removed from the baler.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

Having thus described our invention, what we claim is:

1. In a crop material baler having a bale case, a feed chamber extending toward said bale case in crop delivery relation therewith, means operable over said feed chamber for feeding crop material into said bale case, said feeding means being spaced above and extending along said feed chamber, feed finger means connected to and depending from said feeding means and capable of extending into said feed chamber for engaging crop material therein, and means for reciprocating said feeding means for periodically causing said fingers to engage crop material in said feed chamber and to convey the material toward said bale case, said reciprocating means including first and second rotating means, the combination therewith of first and second means for connecting opposite end portions of said feeding means to said first and second rotating means, respectively, said connecting means comprising first and second members rotatably journalled in said opposite end portions of said feeding means, each of said members having a laterally outwardly extending portion, and clamping means carried by said first and second rotating means engageable with said laterally outwardly extending portions to securely hold said feeding means during operation of the baler, said clamping means being releasable from said laterally outwardly extending portions whereby said feeding means can be easily assembled and disassembled from said first and second rotating means to facilitate servicing and the like.

2. In a crop material baler as set forth in claim 1 wherein each of said clamping means includes a C-shaped member adapted to embrace said laterally outwardly extending portion, and fastening means extending through spaced apart portions of the C-shaped member to hold the C-shaped member tightly about the laterally outwardly extending portions during normal operation of the baler but releasable to permit the laterally outwardly extending portions to be withdrawn from the C-shaped member.

3. In a crop material baler as set forth in claim 1 wherein said first and second rotatably journalled members comprise shafts.

4. In a crop material baler as set forth in claim 1 wherein said first connecting means includes a chain link connector adapted to be secured at either side to separate links of a roller chain, a generally C-shaped portion extending outwardly from said chain link connector substantially midway between the connection to the chain links, and releasable fastening means adapted to pass through apertures in opposed portions of said C-shaped portion whereby said C-shaped portion can be releasably secured about said first laterally outwardly extending portion.

5. In a crop material baler as set forth in claim 4 wherein said laterally outwardly extending portion is generally circular in cross section and has a groove engageable by said fastening means.

6. In a crop material baler having a bale case and a feed chamber disposed to one side of the bale case and extending towards said bale case in crop delivery relationship thereto, the combination therewith of an infeed mechanism comprising first and second rotary means transversely disposed with respect to said bale case, a feed finger support mechanism spaced above said feed chamber, feed finger means connected to and depending from said support mechanism and capable of extending into said feed chamber for engaging crop material therein, first means interconnecting a first portion of said support mechanism with said first rotary means, second connection means connected with said second rotary means, said support mechanism being interconnected with said second connection means by a support structure for reciprocable movement relative thereto, said first interconnecting means and second connection means respectively including first and second shafts rotatably journalled in said first portion of said support mechanism and said support structure, respectively, each of said shafts having a laterally outwardly extending portion, and clamping means carried by said first and second rotary means and adapted to releasably embrace said laterally outwardly extending portions.

7. A crop material baler comprising:
a feed chamber;
a bale case;
a feed mechanism operable to sweep crop material from said feed chamber into said bale case, said feed mechanism including a feed finger supporting mechanism, a channel member supporting said feed finger supporting mechanism for reciprocating movement of said supporting mechanism relative to said channel member, and first and second timed drive mechanisms respectively engaging spaced apart portions of said feed finger supporting mechanism and said channel member and adapted to impart a generally oval movement to said feed finger supporting mechanism;
first and second connecting means for respectively connecting said feed finger supporting mechanism and said channel member to said respective first and second drive mechanisms, said first and second connecting means comprising members rotatably journalled respectively in said feed finger supporting mechanism and said channel members at said respective spaced apart portions thereof with each of said members having a laterally outwardly extending portion, and clamping means carried by said respective first and second drive mechanisms and securely engageable with said respective laterally outwardly extending portions of said members to hold said feed mechanisms during operation of said baler, said clamping means being releasable from said members, whereby said feed finger supporting mechanism and said channel member can easily be respectively assembled and disassembled from said first and second drive mechanisms to facilitate servicing and the like.

* * * * *

UNITED STATES PATENT OFFICE
CERTIFICATE OF CORRECTION

Patent No. 3,812,777  Dated May 28, 1974

Inventor(s) Robert G. Young et al

It is certified that error appears in the above-identified patent and that said Letters Patent are hereby corrected as shown below:

Please change the surname of the one inventor on the title page in both instances from "Yound" to --Young--.

Signed and sealed this 17th day of September 1974.

(SEAL)
Attest:

McCOY M. GIBSON JR.
Attesting Officer

C. MARSHALL DANN
Commissioner of Patents